(12) United States Patent
Reband et al.

(10) Patent No.: US 11,577,661 B2
(45) Date of Patent: Feb. 14, 2023

(54) STORAGE ORGANIZING ARTICLE AND SYSTEM

(71) Applicant: THERMOFLEX CORP., Waukegan, IL (US)

(72) Inventors: David Reband, Antioch, IL (US); Robert Price, Mettawa, IL (US)

(73) Assignee: THERMOFLEX CORP., Waukegan, IL (US)

( * ) Notice: Subject to any disclaimer, the term of this patent is extended or adjusted under 35 U.S.C. 154(b) by 0 days.

(21) Appl. No.: 17/080,386

(22) Filed: Oct. 26, 2020

(65) Prior Publication Data
US 2022/0126760 A1  Apr. 28, 2022

(51) Int. Cl.
*B60R 11/00* (2006.01)
*B60R 7/02* (2006.01)
*B60P 7/08* (2006.01)

(52) U.S. Cl.
CPC ............. *B60R 11/00* (2013.01); *B60P 7/0892* (2013.01); *B60R 7/02* (2013.01); *B60R 2011/0029* (2013.01)

(58) Field of Classification Search
CPC .. B60P 7/0892; B60R 7/02; B60R 2011/0029; A63H 33/086
See application file for complete search history.

(56) References Cited

U.S. PATENT DOCUMENTS

| | | | |
|---|---|---|---|
| 2,621,807 A * | 12/1952 | Rendich | B23Q 16/001 269/54.5 |
| 3,802,144 A | 4/1974 | Spica | |
| 3,868,798 A | 3/1975 | Spica | |
| 4,222,695 A * | 9/1980 | Sarides | B60N 3/046 410/68 |
| 4,358,035 A * | 11/1982 | Heidecker | B60R 7/02 220/533 |

(Continued)

FOREIGN PATENT DOCUMENTS

WO  00/16611  3/2000

OTHER PUBLICATIONS

International Search Report and Written Opinion from related PCT Appln. No. PCT/US2021/072007, dated Dec. 1, 2021.

*Primary Examiner* — Justin M Larson
(74) *Attorney, Agent, or Firm* — Grossman, Tucker, Perreault & Pfleger, PLLC

(57) ABSTRACT

A storage organizing article, comprising a foundation comprising a horizontal floor; a vertical wall comprising a plurality of vertical wall segments; wherein the plurality of vertical wall segments are releasably connectable to each other; wherein the plurality of vertical wall segments are releasably connectable to the foundation via a plurality of engagement footings of the plurality of vertical wall segments; wherein the horizontal floor has a base wall, a plurality of retention members and a plurality of engagement receptacles; wherein each engagement receptacle is formed by a sub-grouping of the plurality of retention members, respectively; and wherein, when the foundation and vertical wall are connected, each of the engagement footings is disposed one of the engagement receptacles, respectively, and forms a releasable interference fit with the sub-grouping of the plurality of retention members which form the engagement receptacle, respectively.

26 Claims, 12 Drawing Sheets

(56) References Cited

U.S. PATENT DOCUMENTS

| | | | | |
|---|---|---|---|---|
| 4,538,737 A * | 9/1985 | Delaney | ................ | B60P 7/0892 |
| | | | | 206/560 |
| 4,941,784 A * | 7/1990 | Flament | ................... | B60R 7/02 |
| | | | | 211/184 |
| 4,964,833 A * | 10/1990 | Suzuki | ................. | A63H 33/086 |
| | | | | 446/118 |
| 5,131,709 A | 7/1992 | Spica | | |
| 5,215,205 A | 6/1993 | Behlman | | |
| 5,597,193 A * | 1/1997 | Conner | ................ | B60P 7/0892 |
| | | | | 224/404 |
| 5,599,055 A | 2/1997 | Brown | | |
| 5,661,941 A * | 9/1997 | Vataker | ................ | A63H 33/086 |
| | | | | 52/604 |
| 5,662,305 A * | 9/1997 | Shimamura | ............ | A47B 91/00 |
| | | | | 224/42.33 |
| 5,788,310 A | 8/1998 | McKee | | |
| 5,976,672 A * | 11/1999 | Hodgetts | ................ | B32B 27/32 |
| | | | | 428/116 |
| 6,012,885 A * | 1/2000 | Taylor | ................... | B60P 7/0892 |
| | | | | 410/121 |
| 6,241,439 B1 * | 6/2001 | Weber | ....................... | B60R 7/02 |
| | | | | 410/121 |
| 6,244,802 B1 * | 6/2001 | Stanesic | ................ | B60P 7/0892 |
| | | | | 410/122 |
| 6,443,796 B1 * | 9/2002 | Shackelford | ......... | A63H 33/042 |
| | | | | 273/237 |
| 6,503,036 B1 * | 1/2003 | Bequette | .................. | B60P 3/40 |
| | | | | 410/121 |
| 6,575,313 B1 * | 6/2003 | Chen | ....................... | B25H 3/02 |
| | | | | 211/70.6 |
| 6,648,569 B2 | 11/2003 | Douglass et al. | | |
| 6,702,532 B1 * | 3/2004 | Throener | .............. | B60P 7/0892 |
| | | | | 410/121 |
| 6,890,138 B1 * | 5/2005 | Myrick | ................. | B60P 7/0892 |
| | | | | 410/94 |
| 7,666,054 B2 * | 2/2010 | Glickman | ............ | A63H 33/082 |
| | | | | 446/124 |
| 7,717,264 B2 * | 5/2010 | Bettenhausen | ........ | A61B 50/30 |
| | | | | 206/370 |
| 7,861,860 B2 * | 1/2011 | Bettenhausen | ........ | A61B 50/34 |
| | | | | 206/370 |
| 7,966,949 B2 * | 6/2011 | Willey | ................... | B60N 3/002 |
| | | | | 108/44 |
| 8,272,508 B2 * | 9/2012 | Bettenhausen | ........ | A61B 50/33 |
| | | | | 206/370 |
| 8,931,987 B2 * | 1/2015 | Hibbard | ................. | B60P 7/135 |
| | | | | 410/121 |
| 9,022,267 B2 * | 5/2015 | Wisselmann | ....... | B60R 11/0241 |
| | | | | 224/552 |
| D731,596 S | 6/2015 | Jensen | | |
| 9,636,429 B2 * | 5/2017 | Cushion | ................... | A61L 2/26 |
| 9,956,918 B2 * | 5/2018 | Thom | ....................... | B60R 7/02 |
| D830,584 S * | 10/2018 | Comitale | ..................... | D25/138 |
| 10,252,176 B1 * | 4/2019 | Cecchin | ................ | A63H 33/042 |
| 10,557,275 B2 * | 2/2020 | Lescord | .................... | E04G 1/36 |
| 10,575,933 B2 * | 3/2020 | Berg | ..................... | A61B 50/34 |
| 10,618,159 B2 * | 4/2020 | Maruzzo | ................ | A47B 88/988 |
| 10,737,609 B2 * | 8/2020 | Stanesic | .................. | B60P 7/14 |
| 10,835,339 B2 * | 11/2020 | Krensky | ............... | A61B 50/20 |
| 10,898,821 B2 * | 1/2021 | Poulus | .................. | A63H 33/04 |
| 10,945,804 B2 * | 3/2021 | Matityahu | ............. | A61B 90/08 |
| 2007/0235488 A1 * | 10/2007 | Wang | ....................... | B60R 5/04 |
| | | | | 224/539 |
| 2014/0083886 A1 * | 3/2014 | Winterrowd | ........... | A61B 50/34 |
| | | | | 206/370 |
| 2016/0059790 A1 | 3/2016 | Perelli et al. | | |
| 2017/0027411 A1 * | 2/2017 | Gobi | ..................... | A47L 15/505 |
| 2017/0087480 A1 * | 3/2017 | Poulus | .................. | A63H 33/086 |
| 2020/0054957 A1 * | 2/2020 | Chan | ...................... | A63H 33/08 |

* cited by examiner

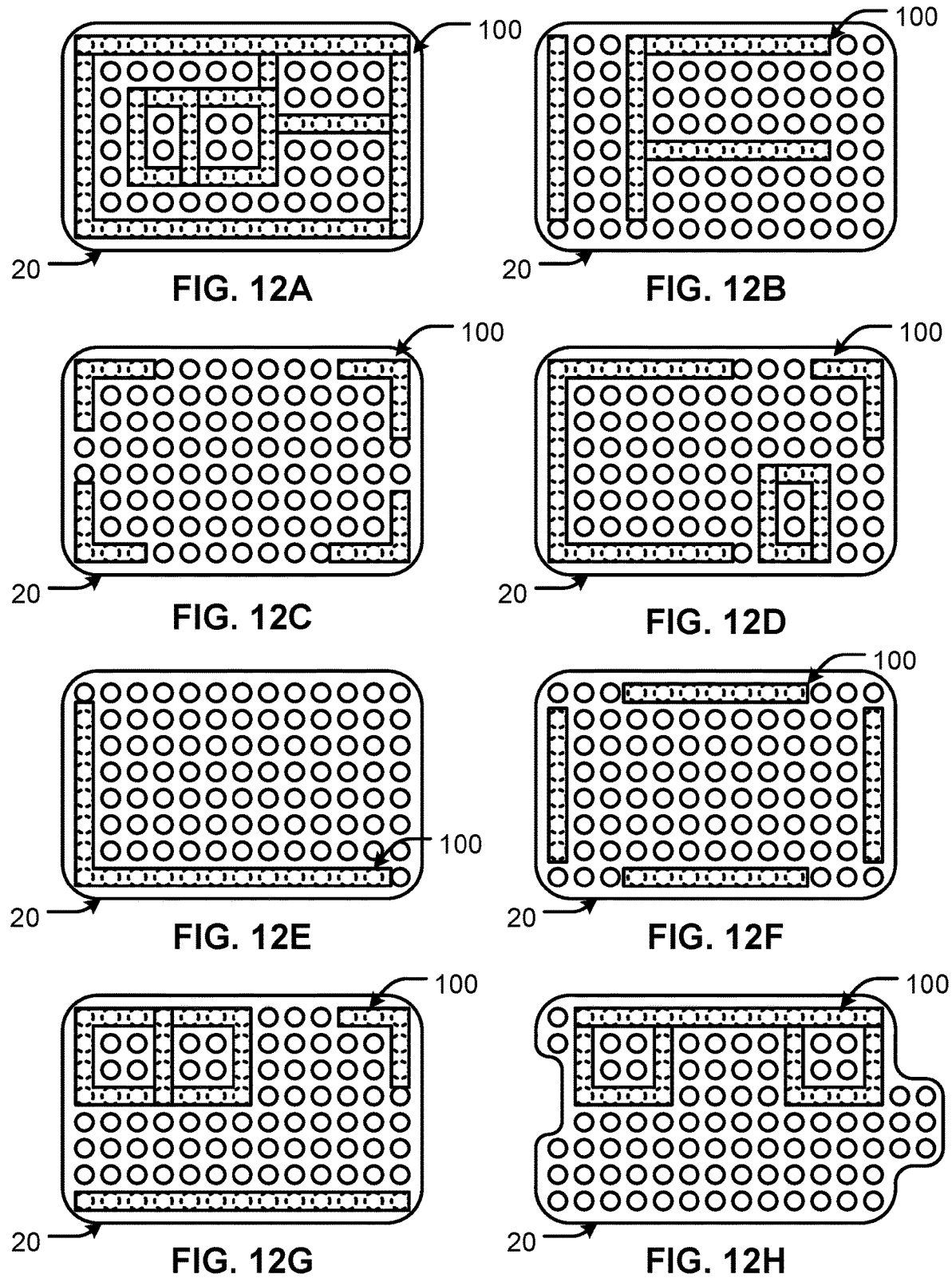

STORAGE ORGANIZING ARTICLE AND SYSTEM

FIELD

The present disclosure relates to a storage organizing article and system, particularly for a motor vehicle such as a land vehicle (e.g. automobile).

BACKGROUND

The storage and organizing of articles within a motor vehicle has led to a variety of designs for the consumer. Along such lines, the need remains for a storage organizing article that allows a consumer the ability to customize and provide locations within the vehicle where articles maybe stored and isolated from other items within the vehicle.

SUMMARY

A storage organizing article is provided, which comprises a foundation comprising a horizontal floor; a vertical wall comprising a plurality of vertical wall segments; wherein the plurality of vertical wall segments are releasably connectable to each other; wherein the plurality of vertical wall segments are releasably connectable to the foundation via a plurality of engagement footings of the plurality of vertical wall segments; wherein the horizontal floor has a base wall, a plurality of retention members and a plurality of engagement receptacles; wherein each engagement receptacle of the plurality of engagement receptacles is formed by a sub-grouping of the plurality of retention members, respectively; and wherein, when the foundation and vertical wall are connected, each of the engagement footings of the plurality of engagement footings is disposed in one of the engagement receptacles of the plurality of engagement receptacles, respectively, and forms a releasable friction fit with the sub-grouping of the plurality of retention members which form the engagement receptacle, respectively.

In at least one embodiment, each of the engagement footings of the plurality of engagement footings comprises a projection, respectively; each retention member of each sub-grouping of the plurality of retention members comprises a projection which projects vertically upward relative to the base wall, respectively; and, when the foundation and vertical wall are connected, each projection of each of the engagement footings is disposed in one of the engagement receptacles, respectively, and forms a releasable friction fit with each of the projections of each sub-grouping which forms the engagement receptacle, respectively.

In at least one embodiment, the projection of each of the engagement footings is substantially identical.

In at least one embodiment, the projection of each of the engagement footings is cylindrical in cross-section.

In at least one embodiment, the projection of each retention member of each sub-grouping is substantially identical.

In at least one embodiment, the projection of each retention member of each sub-grouping is polygonal in cross-section.

In at least one embodiment, the projection of each retention member of each sub-grouping is square in cross-section.

In at least one embodiment, each engagement receptacle of the plurality of engagement receptacles formed by a sub-grouping of the plurality of retention members is formed by four retention members, respectively.

In at least one embodiment, each sub-grouping of the plurality of retention members is formed by four retention members, respectively.

In at least one embodiment, the four retention members of each sub-grouping are substantially equally spaced around a center of each engagement receptacle of the plurality of engagement receptacles, respectively.

In at least one embodiment, the plurality of retention members are arranged in a plurality of rows; wherein a first set of the plurality of rows are substantially parallel to one another; wherein a second set of the plurality of rows are substantially parallel to one another; and wherein the first set of the plurality of rows and the second set of the plurality of rows are substantially perpendicular to one another.

In at least one embodiment, the first set of the plurality of rows comprises at least 2 rows, at least 3 rows, at least 4 rows, at least 5 rows, at least 6 rows, at least 7 rows, at least 8 rows, at least 9 rows, at least 10 rows, at least 11 rows, at least 12 rows or at least 13 rows; and the second set of the plurality of rows comprises at least 2 rows, at least 3 rows, at least 4 rows, at least 5 rows, at least 6 rows, at least 7 rows, at least 8 rows, at least 9 rows, at least 10 rows, at least 11 rows, at least 12 rows or at least 13 rows.

In at least one embodiment, each row of the first set of the plurality of rows comprises at least 2 retention members, at least 3 retention members, at least 4 retention members, at least 5 retention members, at least 6 retention members, at least 7 retention members, at least 8 retention members, at least 9 retention members, at least 10 retention members, at least 11 retention members, at least 12 retention members or at least 13 retention member; and each row of the second set of the plurality of rows comprises at least 2 retention members, at least 3 retention members, at least 4 retention members, at least 5 retention members, at least 6 retention members, at least 7 retention members, at least 8 retention members, at least 9 retention members, at least 10 retention members, at least 11 retention members, at least 12 retention members or at least 13 retention members.

In at least one embodiment, each vertical wall segment of the plurality of vertical wall segments comprises at least a portion of at least one engagement footing of the plurality of engagement footings.

In at least one embodiment, at least one vertical wall segment of the plurality of vertical wall segments comprises at least one engagement footing of the plurality of engagement footings.

In at least one embodiment, at least one vertical wall segment of the plurality of vertical wall segments comprises more than one engagement footing of the plurality of engagement footings.

In at least one embodiment, at least one vertical wall segment of the plurality of vertical wall segments comprises at least two engagement footings of the plurality of engagement footings.

In at least one embodiment, at least one engagement footing of the plurality of engagement footings comprises a first half portion provided by one of the vertical wall segment of the plurality of vertical wall segments, and a second half portion provided by another one of the vertical wall segment of the plurality of vertical wall segments.

In at least one embodiment, the plurality of vertical wall segments are releasably connectable to the foundation along a first axis; at least two of the plurality of vertical wall segments are releasably connectable to each other along a second axis; and the first axis and the second axis are substantially perpendicular to each other.

In at least one embodiment, at least two of the plurality of vertical wall segments are releasably connectable to each other along a third axis; the third axis and the first axis are substantially perpendicular to each other; and the third axis and the second axis are substantially perpendicular to each other, In at least one embodiment, the plurality of vertical wall segments are releasably connectable to each other via a male connector and a female connector which are connectable to provide a connection with positive mechanical engagement.

In at least one embodiment, the base wall is planar.

In at least one embodiment, the foundation further comprises a perimeter rim which at least partially surrounds the horizontal floor.

In at least one embodiment, the foundation further comprises a perimeter rim which completely surrounds the horizontal floor.

In at least one embodiment, the foundation is in a form of a tray.

In at least one embodiment, the foundation is formed of an injection molded thermoplastic composition.

In at least one embodiment, the vertical wall segments are formed of an injection molded thermoplastic composition.

BRIEF DESCRIPTION OF THE DRAWINGS

The above-mentioned and other features of this disclosure, and the manner of attaining them, will become more apparent and better understood by reference to the following description of embodiments described herein taken in conjunction with the accompanying drawings, wherein:

FIGS. 12A-12H are front plan views of the storage organizing article with various configurations of wall segments.

DETAILED DESCRIPTION

Figure 1:
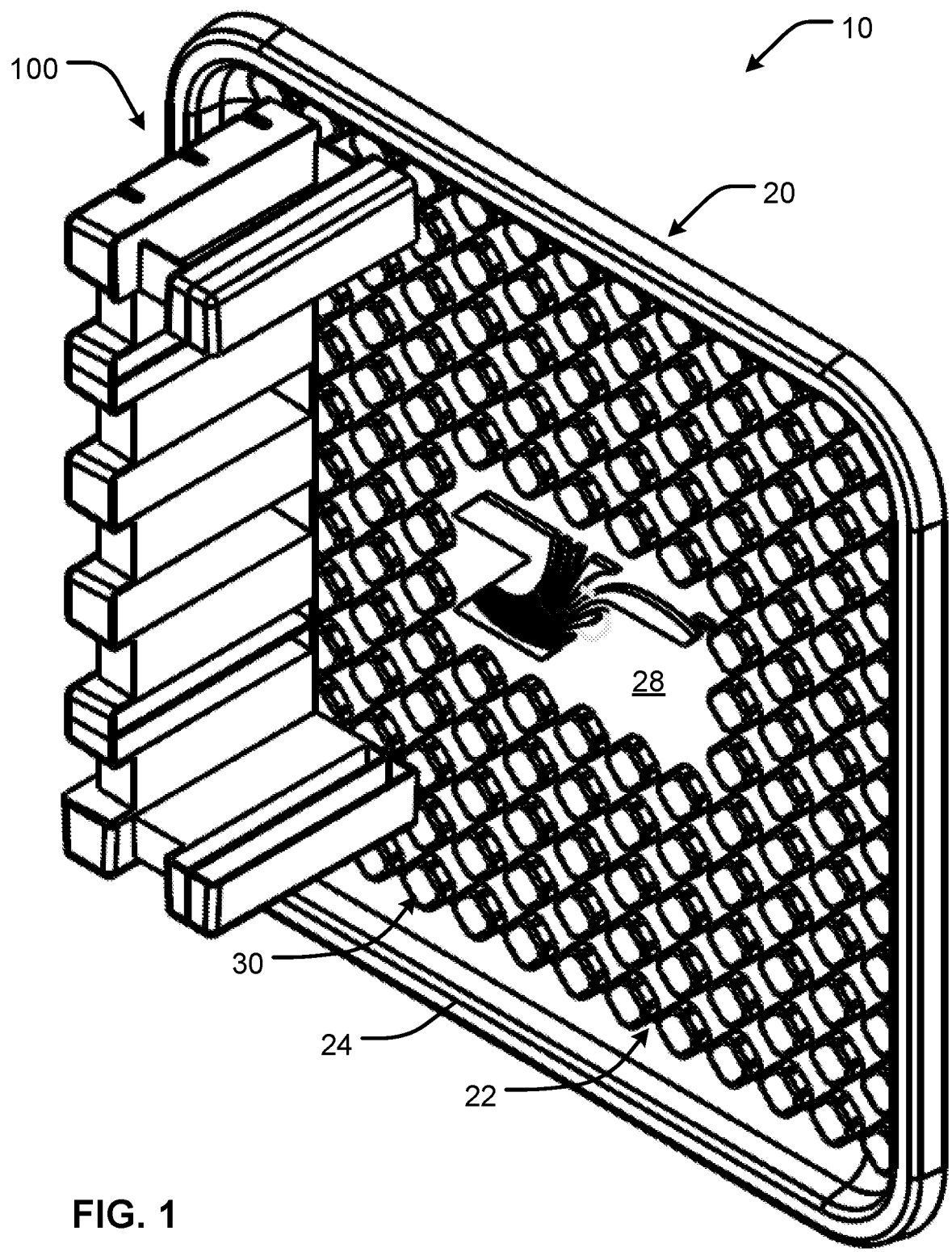
FIG. 1 is an isometric view of a storage organizing article having vertical wall segments connected to a foundation according to the present disclosure.

It may be appreciated that the present disclosure is not limited in its application to the details of construction and the arrangement of components set forth in the following description or illustrated in the drawings. The invention(s) herein may be capable of other embodiments and of being practiced or being carried out in various ways. Also, it may be appreciated that the phraseology and terminology used herein is for the purpose of description and should not be regarded as limiting as such may be understood by one of skill in the art.

Figure 2:
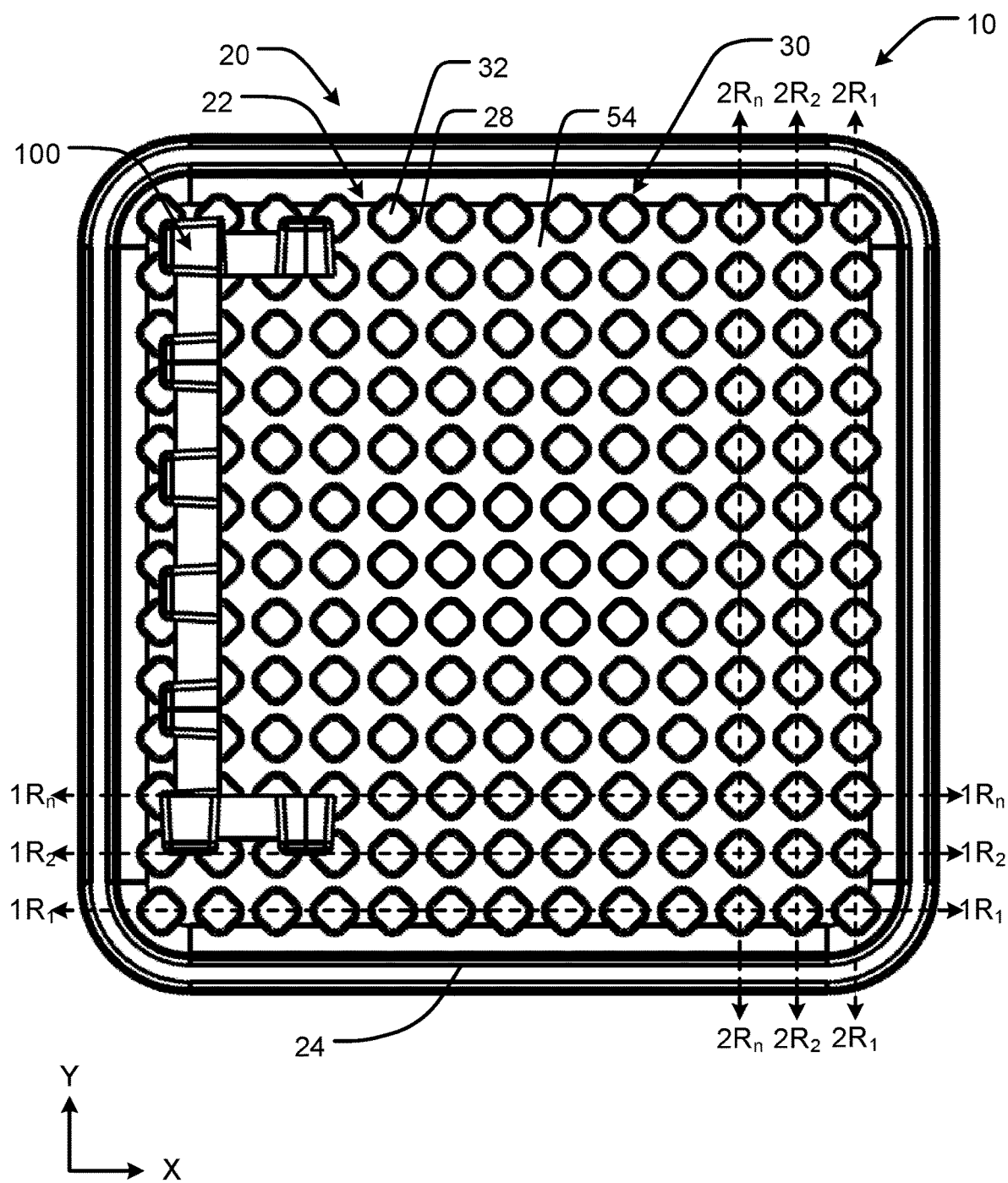
FIG. 2 is a front plan view of the storage organizing article of FIG. 1 (with the center of the horizontal floor filled in with retention members 30)
Figure 3:
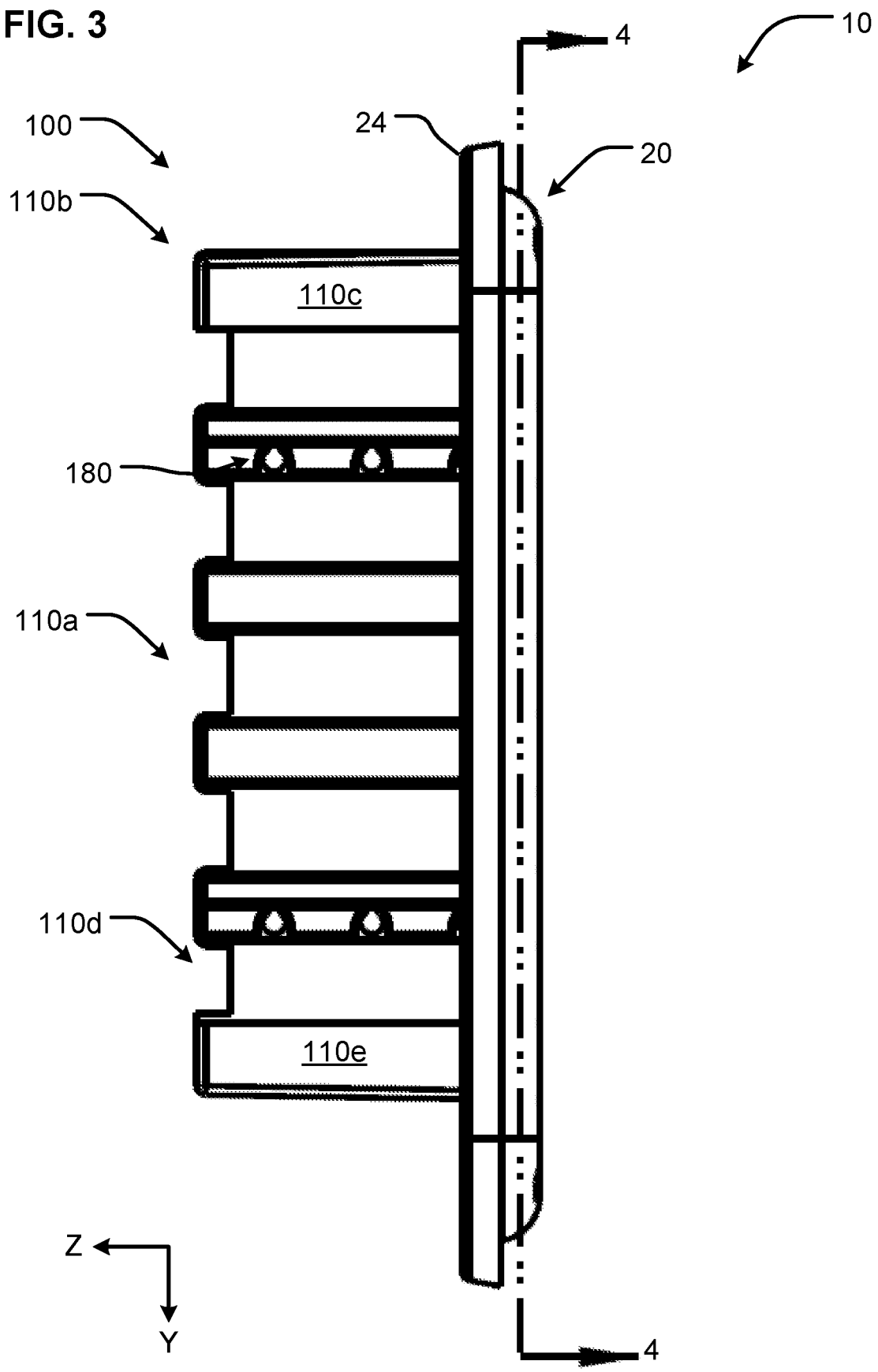
FIG. 3 is a side view of the storage organizing article of FIG. 1.

Referring now to the figures, particularly FIGS. 1-3, there is shown a storage organizing article 10 according to the present disclosure. As shown, storage organizing article 10 comprises a foundation 20, which may be in a form of a tray or shallow container, particularly for a cargo region of the motor vehicle. For a front engine motor vehicle, the cargo region may be a trunk or other storage space typically rearward of a passenger seating region. For a rear engine motor vehicle, or an electric motor vehicle, the cargo region may be a trunk (which may be referred to as a frunk) or other storage space typically forward of a passenger seating region. In either instance, the cargo region may or may not be isolated from the passenger region) of a motor vehicle.

Figure 4:
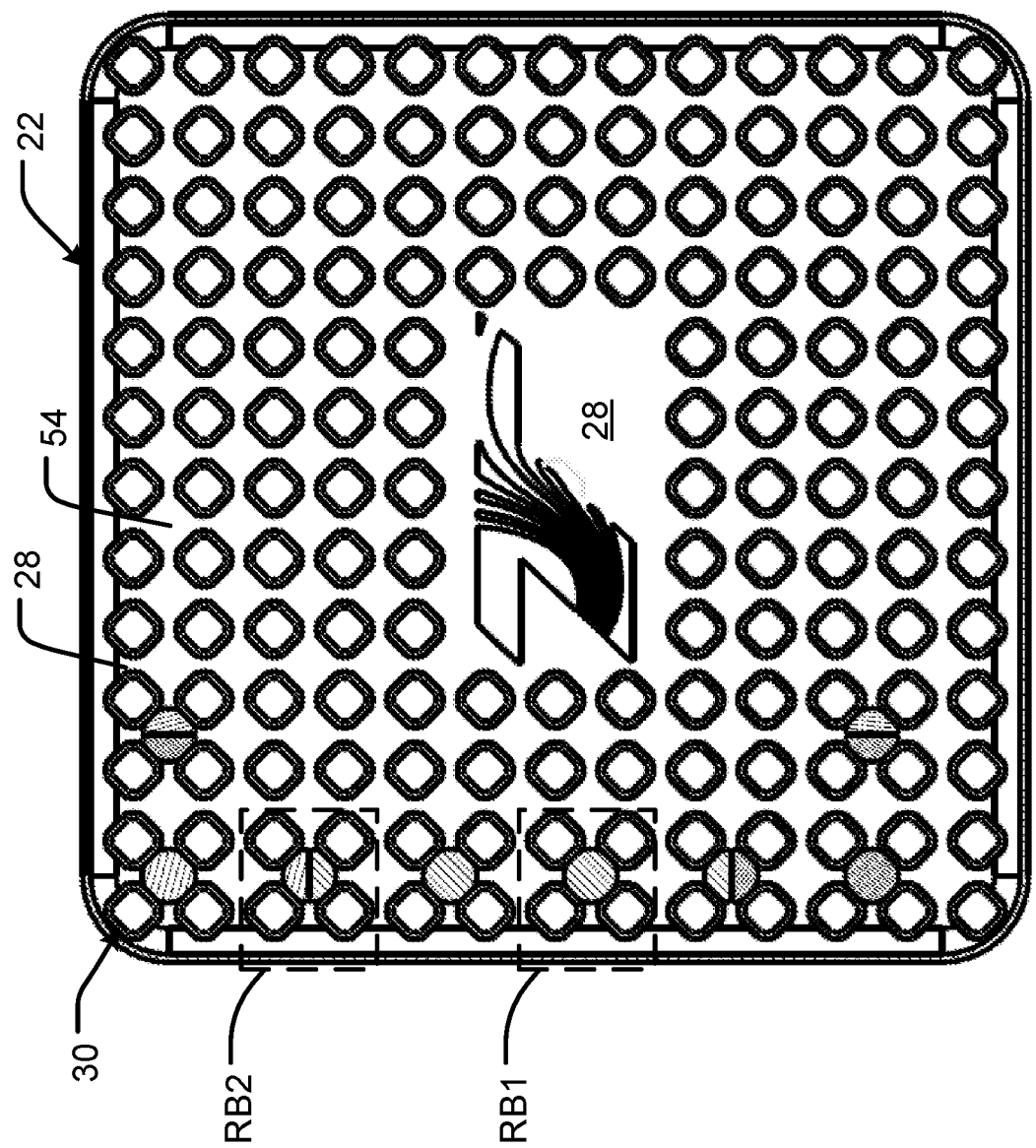
FIG. 4 is a cross-sectional view of the storage organizing article of FIG. 1 taken along line 4-4 of FIG. 3.
Figure 5:
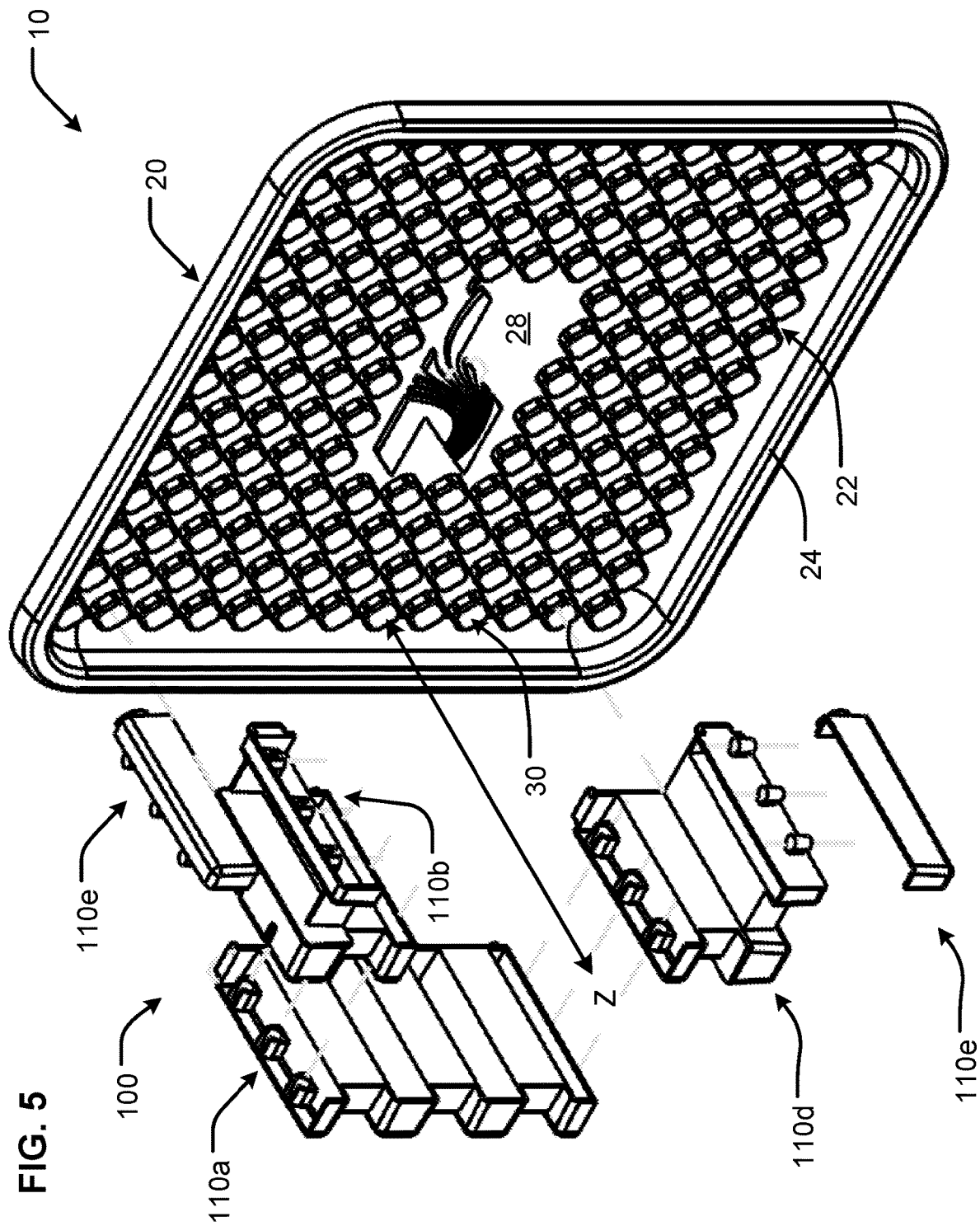
FIG. 5 is an exploded isometric view of the vertical wall segments and the foundation of the storage organizing article of FIG. 1.

In certain embodiments, as shown by FIGS. 1-3, as well as FIGS. 4-5, foundation 20 comprises a polygonal (rectangular and more particularly square) horizontal floor 22. However, in other embodiments, the foundation 20 may have a non-polygonal shape which follows, for example, the contours of a floor pan or vertical side walls defining a perimeter of the cargo area. For example, the one of more sides of the foundation 20 may have one of more recesses and/or protrusions (e.g. see FIG. 12H) which correspond to protrusions and/or recesses in the cargo area, respectively.

As shown, horizontal floor 22 is at least partially surrounded by a vertically raised perimeter rim 24 (which may be referred to a vertically raised containment wall). As shown, the, perimeter rim 24 extends continuously around the horizontal floor 22. It should be understood that the perimeter rim 24 is preferably continuous/uninterrupted around that horizontal floor 22 in that the horizontal floor 22 is completely surrounded/enclosed by the perimeter rim 24 on all bordering sides (i.e. 360 degrees). In other embodiments, the vertically raised perimeter rim 24 may be discontinuous/intermittent around that horizontal floor 22. For example, the vertically raised perimeter rim 24 may be discontinuous/intermittent around that horizontal floor 22 at one or more sides of the foundation 20/horizontal floor 22 or may be completely eliminated at one or more sides of the foundation 20/horizontal floor 22.

Foundation 20 may be particularly configured to contain items stored in a motor vehicle (e.g. groceries, sporting equipment, clothing). In certain embodiments, foundation 20 may be vehicle specific, i.e. dimensioned or otherwise configured to fit a predetermined motor vehicle. As shown, foundation 20 is formed as a single (monolithic) component, particularly by injection molding a thermoplastic composition comprising, essentially consisting of or consisting of a polyolefin (e.g. polypropylene (PP), acrylonitrile-butadiene-styrene (ABS), polyvinyl chloride (PVC)).

As shown by FIGS. 1-5, horizontal floor 22 of foundation 20 preferably has a horizontal, planar base wall 28, with a plurality of repeating retention members 30 to retain vertical wall 100 connectable thereto as explained in greater detail below. As shown, each retention member 30 comprises a raised, spaced apart, vertically upward directed projection 32.

Figure 6:
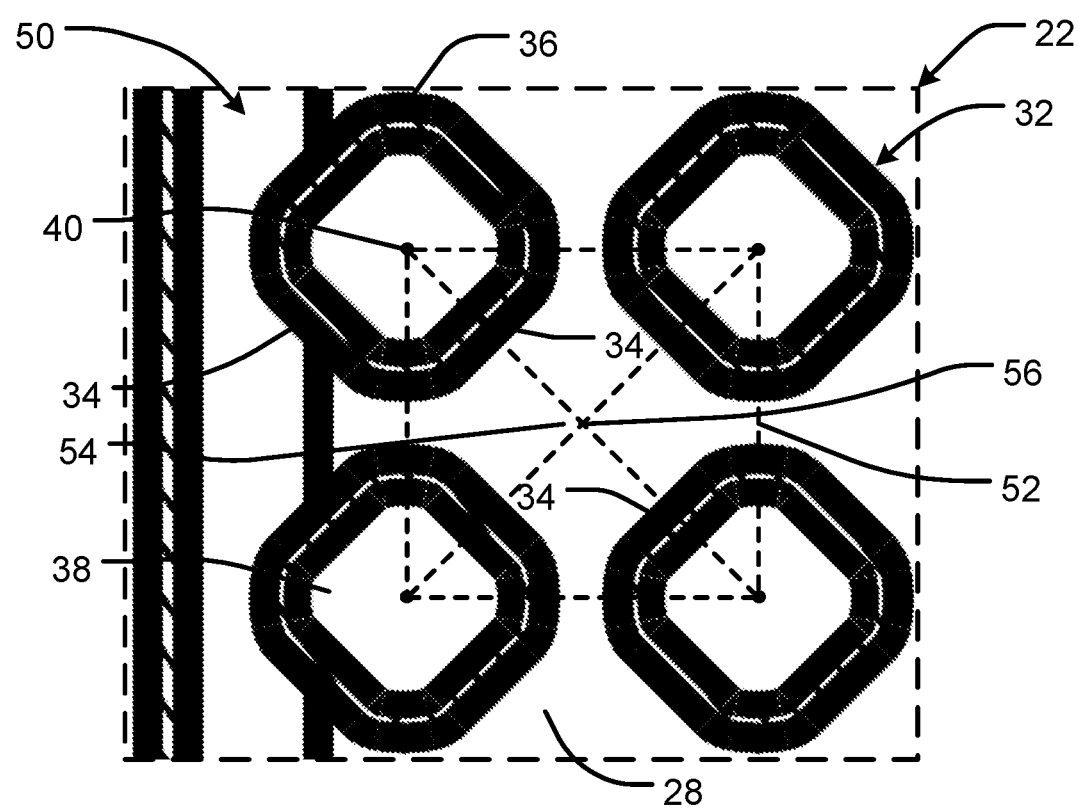
FIG. 6 is an enlarged view of a section of the foundation shown in the dashed line rectangular box RB1 of FIG. 4, before connection of the vertical wall segments to the foundation.

As may be best shown by FIG. 6, each projection 32 is polygonal in cross-section, and more particularly a tetragonal (four sides) in cross-section. Even more particularly, each projection 32 is a square (four sides of equal length) in cross-section. As shown, each projection 32 is square with four, vertical, planar side walls 34 of equal length joined by rounded corners 36 (e.g. a fillet). An end of the projection 32 has a horizontal, square, planar end wall 38, also with rounded corners. Each projection 32 has a center 40, which, while not shown, is a center of a square as determined by the intersection of their respective diagonals. As shown, all the projections 32 have a substantially identical geometry, i.e. having an identical geometry within manufacturing tolerances, and adjacent projections 32 are substantially equally spaced from one another, i.e. having an equal spacing within manufacturing tolerance.

Turning to FIG. 2, the projections 32 may be arranged in a rectangular grid, which has the projections 32 arranged in a first set of linear rows 1Rn (1R$_1$, 1R$_2$, etc.) and a second set of linear rows 2Rn (2R$_1$, 2R$_2$, etc.). As shown, with the first set of rows 1Rn, the rows 1Rn of projections 32 are arranged substantially parallel to one another, i.e. being parallel to each other within manufacturing tolerances. Similarly, with the second set of rows 2Rn, the rows 2Rn of projections 32 are also arranged substantially parallel to one another, i.e. being parallel to each other within manufacturing tolerances. Moreover, as shown, the first set of rows 1Rn of projections 32 and the second set of rows 2Rn of projections 32 are arranged in two directions/along two axes X and Y substantially perpendicular to one another, i.e. being preferably perpendicular to each other within manufacturing tolerances.

As perhaps shown best by FIG. 2, the first set of the plurality of rows 1R comprises at least 2 rows, at least 3 rows, at least 4 rows, at least 5 rows, at least 6 rows, at least 7 rows, at least 8 rows, at least 9 rows, at least 10 rows, at least 11 rows, at least 12 rows or at least 13 rows. The second set of the plurality of rows 2R comprises at least 2 rows, at least 3 rows, at least 4 rows, at least 5 rows, at least 6 rows, at least 7 rows, at least 8 rows, at least 9 rows, at least 10 rows, at least 11 rows, at least 12 rows or at least 13 rows.

As also shown by FIG. 2, each row of the first set of the plurality of rows 1R comprises at least 2 retention members 30, at least 3 retention members 30, at least 4 retention members 30, at least 5 retention members 30, at least 6 retention members 30, at least 7 retention members 30, at least 8 retention members 30, at least 9 retention members 30, at least 10 retention members 30, at least 11 retention members 30, at least 12 retention members 30 or at least 13 retention members 30. Each row of the second set of the plurality of rows 2R comprises at least 2 retention members 30, at least 3 retention members 30, at least 4 retention members 30, at least 5 retention members 30, at least 6 retention members 30, at least 7 retention members 30, at least 8 retention members 30, at least 9 retention members 30, at least 10 retention members 30, at least 11 retention members 30, at least 12 retention members 30 or at least 13 retention members 30.

It should be understood from the foregoing that a row of the first set of rows 1Rn comprises at least two projections 32, and that similarly, a row of the second set of rows 2Rn comprises at least two projections 32. As such, the smallest grid according to the present disclosure is a two-by-two (i.e. 2x2) grid of projections 32, whereby the first set of rows 1Rn comprises two rows and the second set of rows 2Rn comprises two rows, each with two projections 32. It should also be understood that, given the first set of rows 1Rn and the second set of rows 2Rn are similarly composed of projections 32, the distinction between the first set of rows 2Rn and the second set of rows 2Rn delineates the directional arrangement of the sets of rows 1Rn and 2Rn with respect to one another, preferably shown being substantially perpendicular, i.e. being perpendicular to each other within manufacturing tolerances. It should also be understood that, to delineate the first set of rows 2Rn and the second set of rows 2Rn, the first set of rows 1Rn may also be referred to extending in an X-direction/axis of the foundation 20/horizontal floor 22 and the second set of rows 2Rn may be referred to as extending in a Y-direction/axis of the foundation 20/horizontal floor 22, which is substantially perpendicular to the first set of rows 1Rn, i.e. being perpendicular to each other within manufacturing tolerances.

Returning to FIG. 6, the engagement members 30/projections 32 may be arranged in a sub-grouping 50 of four engagement members 30/projections 32, which is used to engage/retain an engagement footing 140 of one or more vertical wall segments 110 as explained in greater detail below. As shown, a sub-grouping 50 of four projections 32 are preferably arranged in a two-by-two (i.e. 2x2) sub-grouping, such that the center 40 of each projection 32 of the sub-grouping 50 of four projections 32 is substantially equal distance, i.e. being equal distance to one another within manufacturing tolerance, from a center 40 of two adjacent projections 32 of the sub-grouping 50 of four projections 32. Stated another way, the center 40 of each projection 32 of the sub-grouping 50 of four projections 32 provides a corner of an imaginary square 52 linking the sub-grouping 50 of four projections 32.

As used herein, a sub-grouping may be understood as a plurality of projections 32, such as at least two projections 32 from the total number of available projections, that engage with the engagement footings 140. As may be appreciated, two opposing projections on opposite sides of the footing 140 may sufficiently define an engagement receptacle for the footing 140. Preferably, the sub-grouping 50 may therefore comprise two or more projections 32 to define an engagement receptacle and therefore may also preferably comprise three or four projections 32.

From the figures, it should be understood that each particular projection 32 is not limited to being a member of one sub-grouping 50, but that a particular projection 32 may be a member of up to four sub-groupings 50. As such, it should be understood that a first sub-grouping 50 and a second-sub-grouping 50 are to be considered two different sub-groupings 50 if they do not share all the same projections 32 in common. Stated another way, if two sub-groupings 50 have at least one uncommon (unshared) projection 32, then the two sub-groupings 50 are different sub-groupings 50. In a case where two sub-groupings 50 do not share any projections 32 in common, the sub-groupings 50 and their respective retention members 30 may be referred to as being exclusive to one another, in addition to being considered different sub-groupings 50.

Also from the figures, it should be understood that a sub-grouping 50 of projections 32 may form two sets of two rows of projections 32, with the rows of each set preferably extending substantially parallel to each other, i.e. being parallel within manufacturing tolerance, respectively, and the sets of rows extending substantially to one another, i.e. being perpendicular within manufacturing tolerance.

As further shown by FIGS. 1-3, 5 and 7-9, storage organizing article 10 further comprises a vertical wall 100 formed of separate and distinct components from foundation 20. The vertical wall 100 includes vertical wall segments 110a, 110b, 110c, 110d and 110e.

Figure 7:
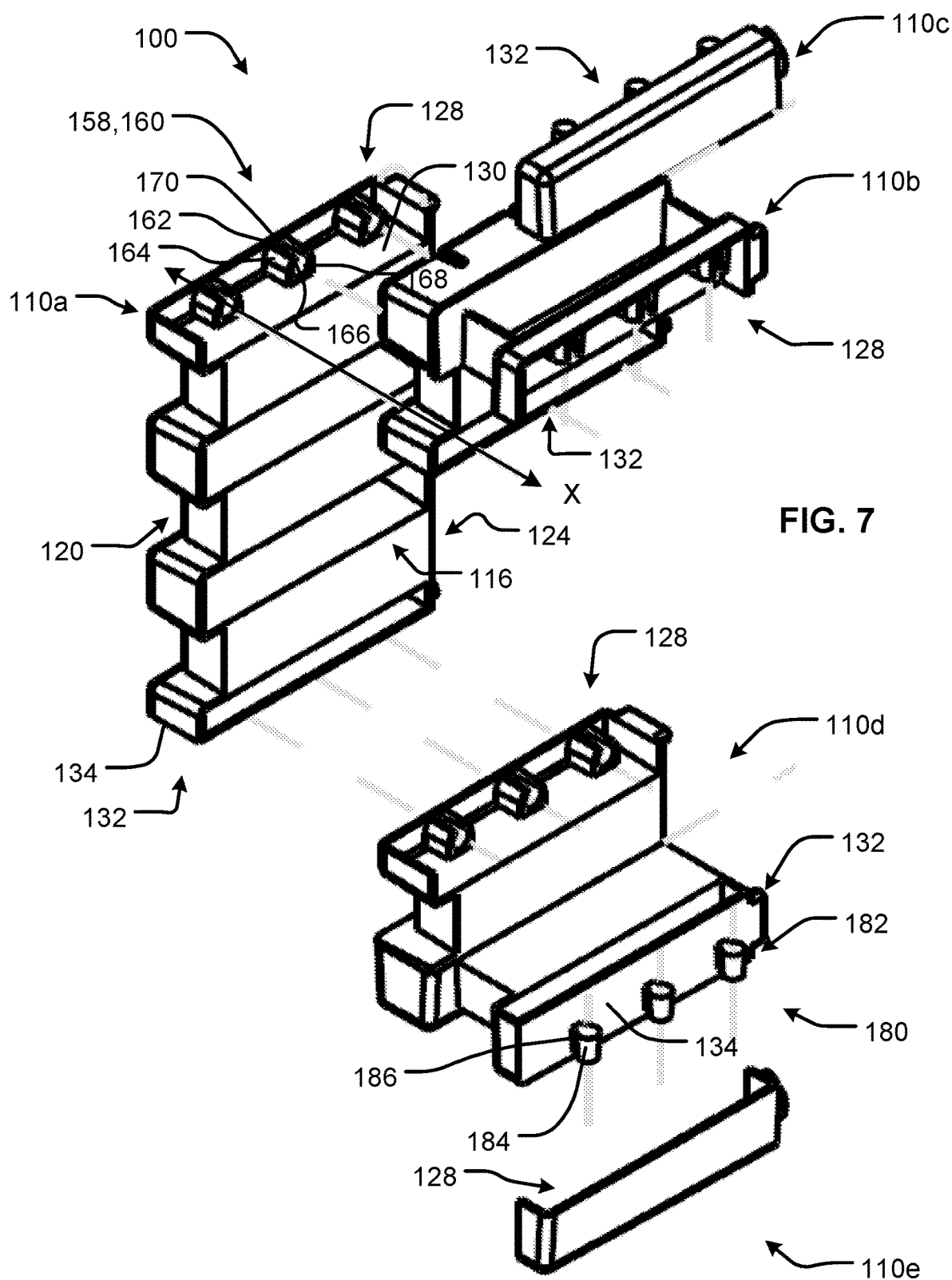
FIG. 7 is an isometric view of the vertical wall segments from FIG. 5.
Figure 8:
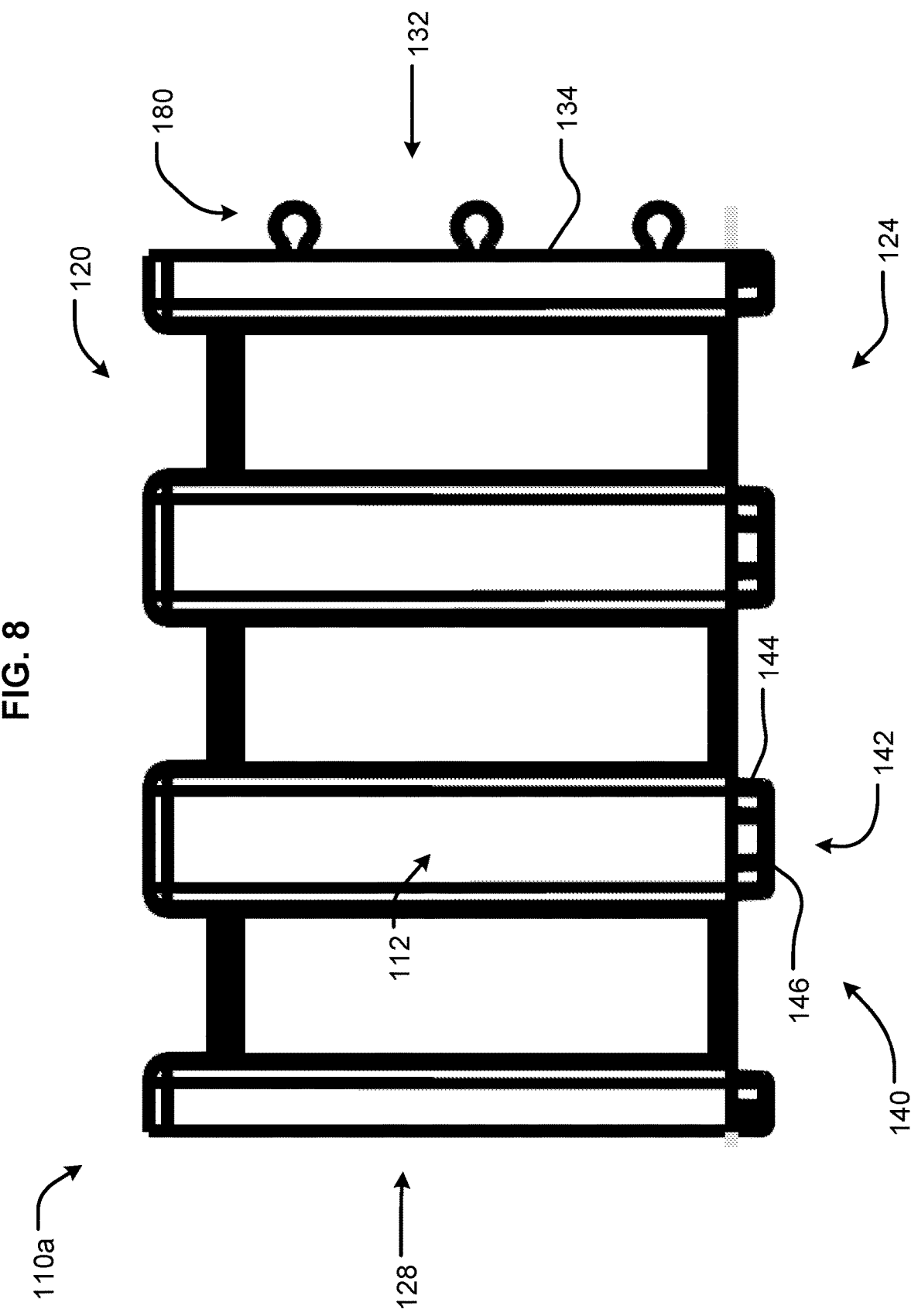
FIG. 8 is side view of a straight (linear) wall segment of the vertical wall segments of FIG. 7.
Figure 9:
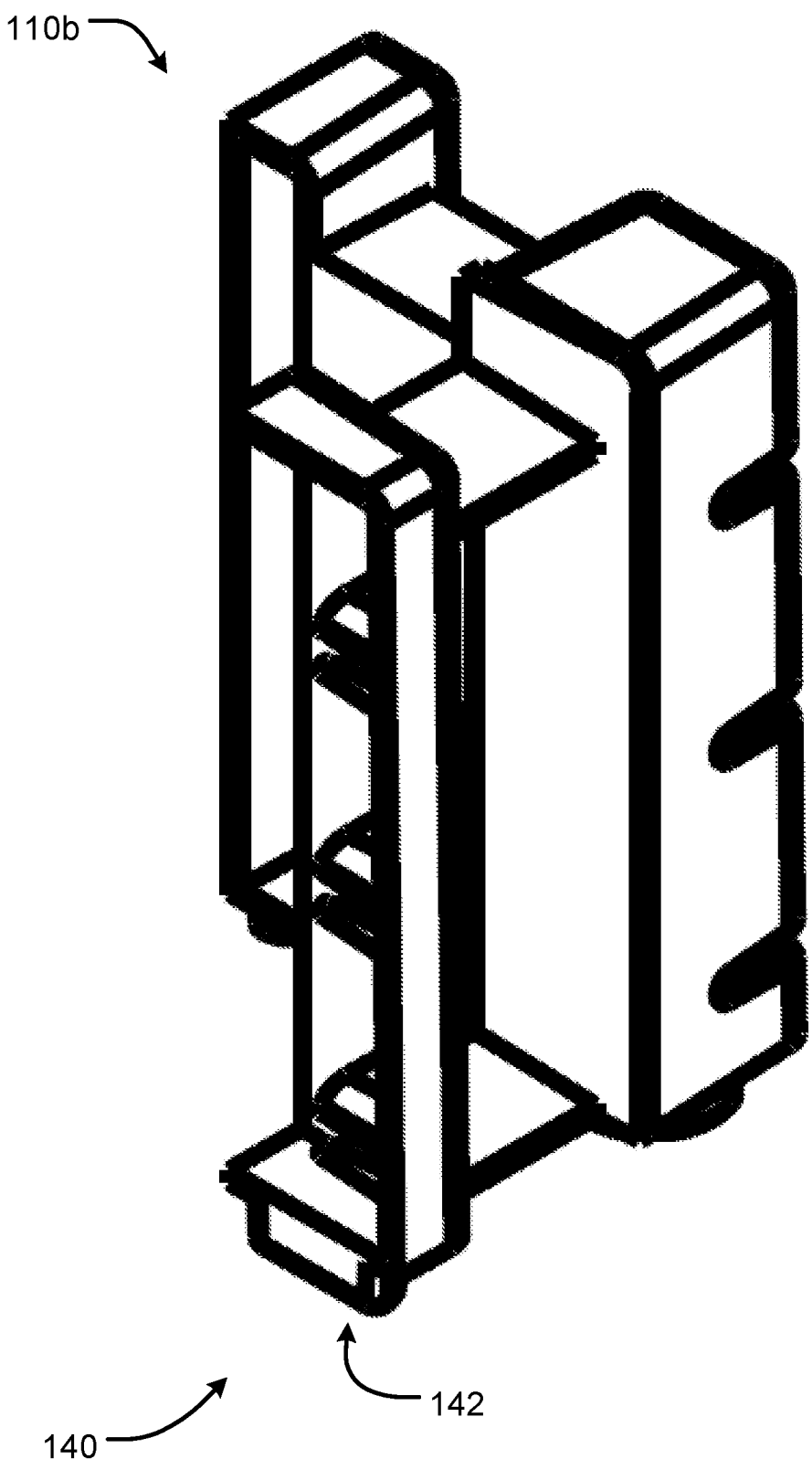
FIG. 9 is an isometric view of a corner (90 degree bend) wall segment of the vertical wall segment of FIG. 7.

As shown by FIGS. 7-8, wall segment 110a has a front face 112, back face 116 (opposite front face 112), top face 120, bottom face 124 (opposite top face 120) and end faces 128, 132 (opposite one another). Bottom face 124 includes at least one engagement footing 140 (shown as a plurality) to engage with foundation 20 and mount wall segment 110*a* to foundation 20.

Figure 10:
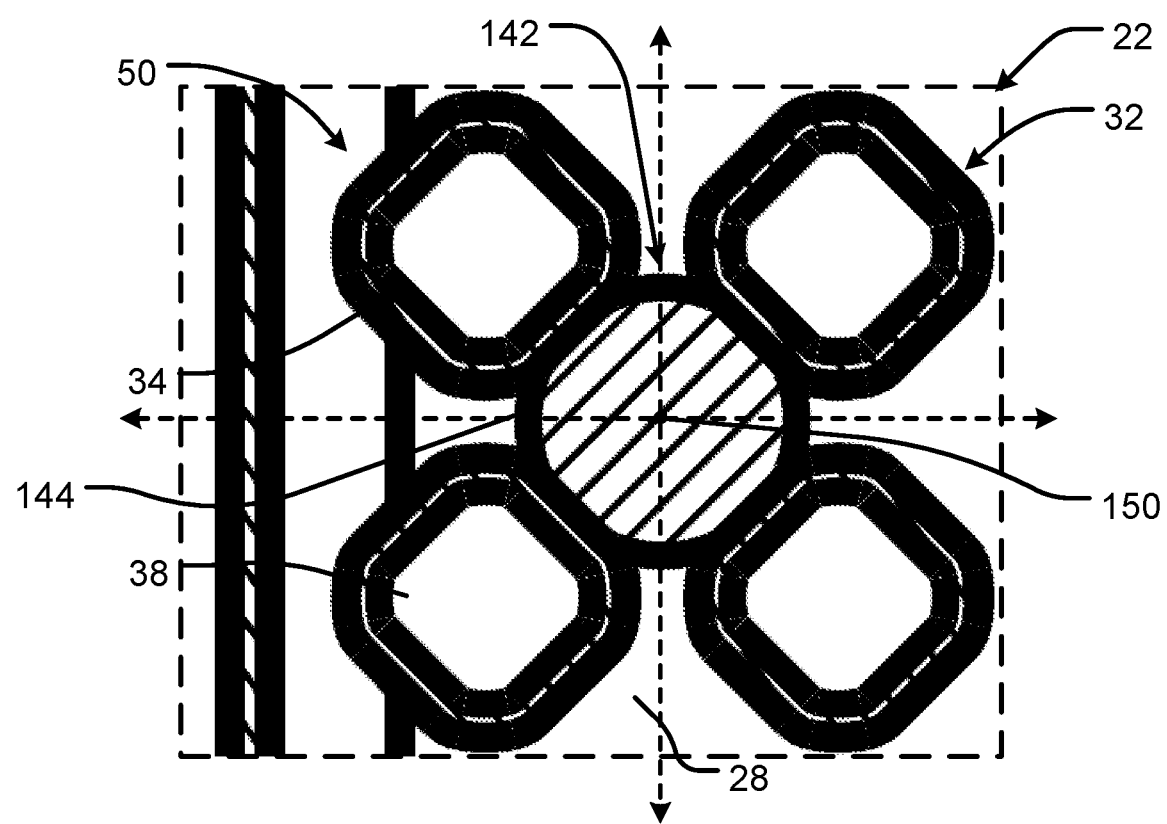
FIG. 10 is an enlarged view of a section of the foundation shown in the dashed line rectangular box RB1 of FIG. 4, after connection of the vertical wall segments to the foundation.

As may be best shown by FIG. 8, each engagement footing 140 comprises a vertically downward projection 142 located on the bottom face 124 of the wall segment 110*a* which, as explained in greater detail below, engages between and with the vertically upward directed projections 32/retention members 30 of foundation 20. As shown by FIG. 10, each projection 142 is preferably cylindrical in cross-section, with a vertical, cylindrical side wall 144. Referring back to FIG. 8, the end of the projection 142 has a horizontal, circular, planar end wall 146. Each projection 142 has a center 150 (see FIG. 10), which is the center of a constant diameter of the cylindrical side wall 144 and the circular end wall 146. As shown, all the engagement footings 140/projections 142 have a substantially identical geometry, i.e. having an identical geometry within manufacturing tolerances.

In order to assemble, and releasably mechanically connect, vertical wall segment 110*a*, to foundation 20 with a releasable mechanical connection, each vertically downward projection 142 is directed (pushed) into an engagement receptacle 54 (see FIG. 6) formed between a sub-grouping 50 of the vertically upward projections 32 of the foundation 20, and fits in the engagement receptacle 54 with a friction fit, which also may be known as an press (interference) fit or pressure grip fit connection. A friction fit connection may be understood herein as a connection formed between two components which solely relies upon friction to inhibit separation of the components, for example by one of the components being pressed into the other component such that at least one of the components is compressed (deformed) against one another.

As also shown in FIG. 6, preferably, the retention members 30/projections 32 are substantially equally spaced around a center 56 of the receptacle 54, i.e. equally spaced within manufacturing tolerance. More particularly, as shown in FIG. 5, each projection 142 is pushed in an engagement receptacle 54 by moving the wall segments 110 along an assembly/disassembly (connection/disconnection) Z-direction/axis, which is transverse to the horizontal floor 22 of foundation 20, which may be understood as being vertical to the horizontal floor 22 of foundation 20, and more preferably perpendicular to the horizontal floor 22 of foundation 20.

Now referring to FIG. 10, once in each engagement receptacle 54, preferably, a portion of each of four 90 degree arcs, of the vertical cylindrical side wall 144 of the projection 142 of the wall segment 110, contacts against one of the planar side walls 34 of the adjacent surrounding projections 32 of the foundation 20 to form the releasable interference fit of the projection 142 with the projections 32 within the engagement receptacle 54. Conversely, the projections 142/engagement footings 140 of wall segments 110 may be removed from the engagement receptacles 54, respectively, by being pulled out of the engagement receptacles 54 in a direction opposite to being inserted in the engagement receptacles 54 to release the connection.

In FIG. 10, the portion of each of the four 90 degree arcs of the vertical cylindrical side wall 144 of the projection 142 of the wall segment 110, which contacts against one of the planar side walls 34 of the adjacent surrounding projections 32 of the foundation 20 to form the releasable interference fit of the projection 142 with the projections 32 may deform in forming the interference fit. More particularly, as shown, the portion of each of the four 90 degree arcs of the vertical cylindrical side wall 144 of the projection 142 of the wall segment 110, which contacts against one of the planar side walls 34 of the adjacent surrounding projections 32 may deform to form a planar surface portion which mates against the planar surface of the corresponding projection 32. Alternatively, prior to assembly, each portion of the cylindrical side wall 144 of the projection 142 of the wall segment 110, which contacts against one of the planar side walls 34 of the adjacent surrounding projections 32 may include a flat (i.e. a planar surface) to form the interference fit.

While not necessary, the vertical, cylindrical side wall 144 of each projection 142 of the wall segment 110 may be equal in vertical length to the vertical, planar side walls 34 of the projections 32 of the foundation 20 such that the planar end wall 146 of each projection 142 of the wall segment 110 may contact against the base wall 28 of the foundation 20 when fully inserted in the engagement receptacles 54. This may therefore provide additional vertical and horizontal stability of the wall segment 110 when affixed to the foundation 20.

Referring again to FIGS. 7 and 8, each end face 128, 132 of wall segment 110*a* preferably includes at least one (first) connector 158 to releasably mechanically connect with a (second) corresponding (mating) connector 158 of an adjacent wall segment 110*b* or 110*d*. As, shown, each end face 128, 132 of wall segment 110*a* preferably includes a plurality of connectors 158 to connect with corresponding (mating) connectors 158 of an adjacent wall segment 110*b* or 110*d*, respectively.

More preferably, as shown, end face 128 of wall segment 110*a* includes a plurality of female connectors 160 to receive a male connector 180 disposed on an end face 132 of wall segment 110*b*. While male connector 180 of wall segment 110*b* is not shown in FIG. 7, it should be understood that the male connector 180 of wall segment 110*b* is the same as the male connector 180 of wall segment 110*d* as shown, as well as all the other male connectors 180. The same may be said for female connectors 160.

As shown, female connector 160 comprises a socket 162 to receive a prong 182 of male connector 180. More particularly, the socket 162 comprises an elongated, tubular, wall 164 disposed on an end wall 130 of connecting end face 128 of wall segment 110*a*. Socket 162 further comprises a cylindrical cavity 166 within tubular wall 164, which an accessable via a circular opening 168 at one end of the tubular wall 164, as well as a slot 170 extending along a longitudinal length (X-direction/axis) of the tubular wall 164, resulting in the tubular wall 164 taking on a form of a C-shape.

Prong 182 of male connector 180 further comprises an elongated cylindrical post 184 disposed at a distal end of an elongated rib 186, which is disposed on the end wall 134 of end face 132 of wall segment 110*b*.

When assembled, post 184 of male connector 180 resides in cylindrical cavity 166 upon entering cavity 166 via circular opening 168, while rib 186 occupies slot 170.

As such, the wall segments 110, 110*c* are releasably mechanically connected to one another via a positive mechanical engagement, as opposed to the interference (friction/press) fit to the foundation 20.

More particularly, socket 162 and prong 182 are assembled by moving one or both of the wall segment 110*a* and the wall segment 110*b* along the X-direction/axis. Wall segment 110*b* and 110*d* are assembled in similar manner.

In contrast, wall segments 110*b* and 110*c*, as well as wall segments 110*d* and 110*e* are assembled by moving one or both wall segments along the Y-direction/axis.

After first being fully assembled, wall segments 110*a*-*e* are attached to foundation 20, with the Z-direction/axis traverse to the X-direction/axis and Y-direction/axis the one another, and more preferably perpendicular to one another. More particularly, the X-direction/axis and Y-direction/axis are horizontal, and thus parallel to the horizontal floor 22 of foundation 20, while the Z-axis is vertical, and thus perpendicular to the horizontal floor 22 of foundation 20. In such manner, the wall segments 110 are preferably inhibited from separating from one another as long as the wall segments 110 remain connected to the foundation 20. By virtue of the orientation of the assembly/disassembly axes, the wall segments 110*a*-*e* are to be disassembled (separated) from foundation 110 before being disassembled (separated) from each other. Similarly, when assembled, the wall segments 110*a*-*e* are to be assembled (connected) to each other before being assembled (connected) to the foundation 110.

Figure 11:
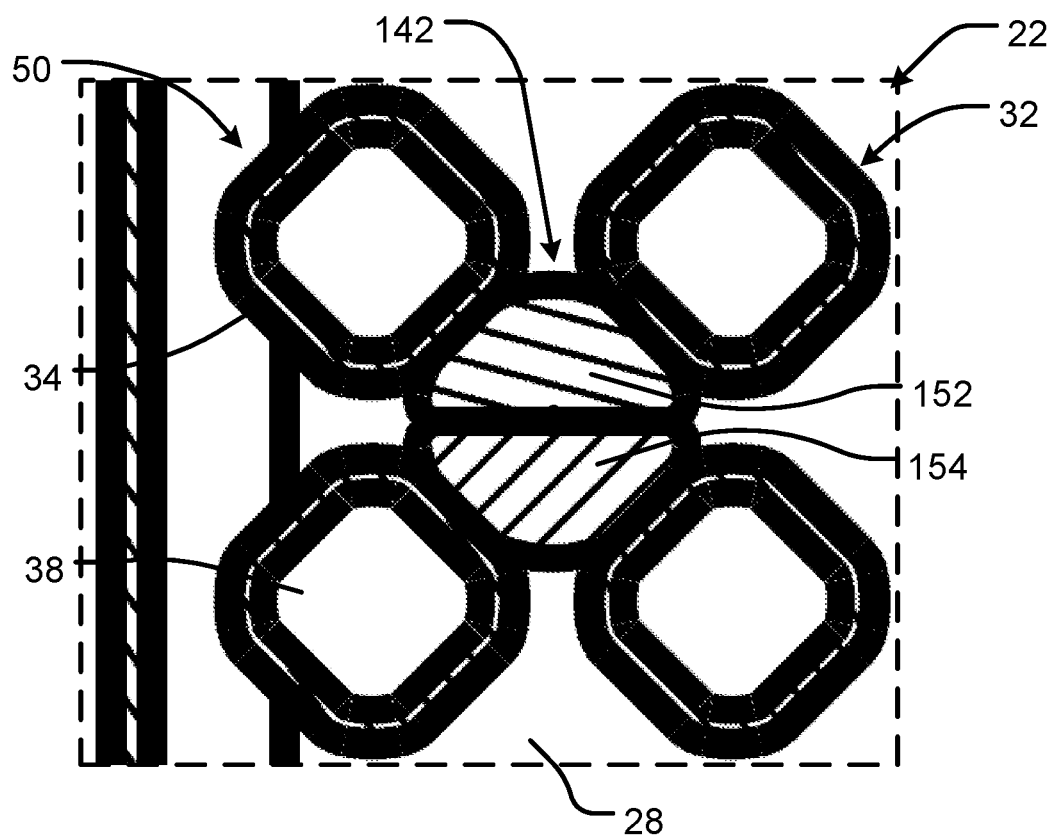
FIG. 11 is an enlarged view of a section of the foundation shown in the dashed line rectangular box RB2 of FIG. 4, after connection of the vertical wall segments to the foundation.

As shown in FIG. 10, the engagement footing 140, and more particularly the cylindrical projection 142, is formed solely by the straight (linear) wall segment 110*a*. However, as shown in FIG. 11, the engagement footing 140, and more particularly the cylindrical projection 142, is formed by two adjacent wall segments 110*a* and 110*b*. As shown, the engagement footing 140, and more particularly the cylindrical projection 142, is formed of a first (half) projection portion 152 provided by the vertical wall segment 110*a*, and a second (half) projection portion 152 provided by the vertical wall segment 110*b*.

In light of the foregoing, and as shown by the figures, it should be understood that each vertical wall segment 110*a*-110*e* of the plurality of vertical wall segments 110 comprises at least a portion of at least one engagement footing 140 of the plurality of engagement footings 140. As also shown by the figures, at least one vertical wall segment 110 of the plurality of vertical wall segments 110 comprises at least one engagement footing 140 of the plurality of engagement footings 140 (e.g. 110*a*, 110*b*, 110*c*). As also shown by the figures, at least one vertical wall segment 110 of the plurality of vertical wall segments 110 comprises more than one engagement footing 140 of the plurality of engagement footings 140 (e.g. 110*a*, 110*b*, 110*c*). As also shown by the figures, at least one vertical wall segment 110 of the plurality of vertical wall segments 110 comprises at least two engagement footings 140 of the plurality of engagement footings 140 (e.g. 110*a*).

As shown by FIGS. 1-3, 5 and 7, vertical wall 100 comprises a straight (linear) wall segment 110*a* (e.g. see FIG. 8 individually), two corner (90 degree bend) wall segments 110*b*, 110*d* (e.g. see FIG. 9 individually), and two end caps 110*c*, 110*e*, to cover ends of linear wall segments 110*a* and/or corner wall segments 110*b*, 110*d* at a terminal end of the vertical wall 100. While vertical wall 100 is shown in a U-shaped configuration, it should be understood that numerous configurations are possible with the various wall segments 110*a*-110*e*, and that additional wall segments 100*a*-110*e* may be used in further repetition or wall segments 110*a*-110*e* may be eliminated. For example, a polygonal (tetragonal) shape (four sides) vertical wall 100 may be created by adding three additional straight (linear) wall segment 110*a* and two corner wall segments 110*e*, 100*d*, while end caps 110*c*, 110*e* may be eliminated. Such may be seen, for example in FIG. 12A. FIGS. 12A-12H show other exemplary configurations/layouts of the vertical wall 100 according to the present disclosure. It should be understood that the various vertical walls 100 shown in each of FIGS. 12A-12H are not exclusive to any particular configuration and can be changed or combined with any vertical wall(s) on any other illustrated configuration as feasible.

The wall segments 110*a*-110*e* may be formed by injection molding a thermoplastic composition comprising, essentially consisting of or consisting of a polyolefin (e.g. polypropylene (PP), acrylonitrile-butadiene-styrene (ABS), polyvinyl chloride (PVC)). Wall segments 110-110*e* may also be formed using other molding techniques such as blow molding. Also, in order to consolidate pieces. straight (linear) wall segment 110*a* may incorporate a living hinge which allows the linear wall segment 100*a* to convert to a corner wall segment when bent about the hinge. As such, the linear wall segment and corner wall segment could be consolidated into a single molded part/component.

While a preferred embodiment of the present invention(s) has been described, it should be understood that various changes, adaptations and modifications can be made therein without departing from the spirit of the invention(s) and the scope of the appended claims. The scope of the invention(s) should, therefore, be determined not with reference to the above description, but instead should be determined with reference to the appended claims along with their full scope of equivalents. Furthermore, it should be understood that the appended claims do not necessarily comprise the broadest scope of the invention(s) which the applicant is entitled to claim, or the only manner(s) in which the invention(s) may be claimed, or that all recited features are necessary.

LISTING OF REFERENCE CHARACTERS 10 storage organizing article
20 foundation
22 horizontal floor
24 perimeter rim
28 base wall
30 retention member
32 projection
34 planar side wall
36 rounded corner
38 end wall
40 center
50 sub-grouping of retention members/projections
52 imaginary square
54 engagement receptacle
56 center of engagement receptacle
100 vertical wall
110 vertical wall segments (110*a*-110*e*)
112 front face
116 back face
120 top face
124 base face
128 connecting end face
130 end wall
132 connecting end face
134 end wall
140 engagement footing
142 projection
144 cylindrical side wall
146 end wall
150 center
152 first portion of footing/projection
154 second portion of footing/projection
158 connector
160 female connector
162 socket
164 tubular wall
166 cylindrical cavity 168 circular opening
170 slot
180 male connector
182 prong
184 cylindrical post
186 rib
X direction/axis
Y direction/axis
Z direction/axis
RB1 rectangular box
RB2 rectangular box

What is claimed is:

1. A storage organizing article, comprising:
a foundation comprising a horizontal floor;
a vertical wall comprising a plurality of vertical wall segments;
wherein the plurality of vertical wall segments are releasably connectable to each other;
wherein the plurality of vertical wall segments are releasably connectable to the foundation via a plurality of engagement footings of the plurality of vertical wall segments;
wherein the plurality of vertical wall segments are releasably connectable to the foundation along a first axis;
wherein the plurality of the vertical wall segments comprise at least one linear vertical wall segment and at least one corner vertical wall segment with a fixed 90 degree bend;
wherein the at least one linear vertical wall segment of the plurality of vertical wall segments has two opposite end faces which are each releasably connectable with an end face of two other vertical wall segments of the plurality of vertical wall segments, respectively, along a second axis, wherein at least one of the two other vertical wall segments comprises the at least one corner vertical wall segment;
wherein the first axis and the second axis are substantially perpendicular to each other;
wherein the horizontal floor has a base wall, a plurality of retention members and a plurality of engagement receptacles;
wherein each engagement receptacle of the plurality of engagement receptacles is formed by a sub-grouping of the plurality of retention members, respectively; and
wherein, when the foundation and vertical wall are connected, each of the engagement footings of the plurality of engagement footings is respectively disposed in one of the engagement receptacles of the plurality of engagement receptacles and forms a releasable interference fit with the sub-grouping of the plurality of retention members forming the engagement receptacle.

2. The storage organizing article of claim 1, wherein each of the engagement footings of the plurality of engagement footings comprises a projection;
wherein each retention member of each sub-grouping of the plurality of retention members comprises a projection which projects vertically upward relative to the base wall; and
wherein, when the foundation and vertical wall are connected, each projection of each of the engagement footings is disposed in one of the engagement receptacles and forms a releasable interference fit with each of the projections of each sub-grouping forming the engagement receptacle.

3. The storage organizing article of claim 2, wherein the projection of each of the engagement footings is substantially identical.

4. The storage organizing article of claim 2, wherein the projection of each of the engagement footings is cylindrical in cross-section.

5. The storage organizing article of claim 2, wherein the projection of each retention member of each sub-grouping is substantially identical.

6. The storage organizing article of claim 2, wherein the projection of each retention member of each sub-grouping is polygonal in cross-section.

7. The storage organizing article of claim 2, wherein the projection of each retention member of each sub-grouping is square in cross-section.

8. The storage organizing article of claim 1, wherein each engagement receptacle of the plurality of engagement receptacles formed by a sub-grouping of the plurality of retention members is formed by at least two retention members.

9. The storage organizing article of claim 1, wherein each sub-grouping of the plurality of retention members is formed by four retention members.

10. The storage organizing article of claim 9, wherein the four retention members of each sub-grouping are substantially equally spaced around a center of each engagement receptacle of the plurality of engagement receptacles, respectively.

11. The storage organizing article of claim 1, wherein the plurality of retention members are arranged in a plurality of rows;
wherein a first set of the plurality of rows are substantially parallel to one another;
wherein a second set of the plurality of rows are substantially parallel to one another; and
wherein the first set of the plurality of rows and the second set of the plurality of rows are substantially perpendicular to one another.

12. The storage organizing article of claim 11, wherein the first set of the plurality of rows comprises at least 2 rows, at least 3 rows, at least 4 rows, at least 5 rows, at least 6 rows, at least 7 rows, at least 8 rows, at least 9 rows, at least 10 rows, at least 11 rows, at least 12 rows or at least 13 rows; and
the second set of the plurality of rows comprises at least 2 rows, at least 3 rows, at least 4 rows, at least 5 rows, at least 6 rows, at least 7 rows, at least 8 rows, at least 9 rows, at least 10 rows, at least 11 rows, at least 12 rows or at least 13 rows.

13. The storage organizing article of claim 11, wherein each row of the first set of the plurality of rows comprises at least 2 retention members, at least 3 retention members, at least 4 retention members, at least 5 retention members, at least 6 retention members, at least 7 retention members, at least 8 retention members, at least 9 retention members, at least 10 retention members, at least 11 retention members, at least 12 retention members or at least 13 retention members; and
wherein each row of the second set of the plurality of rows comprises at least 2 retention members, at least 3 retention members, at least 4 retention members, at least 5 retention members, at least 6 retention members, at least 7 retention members, at least 8 retention members, at least 9 retention members, at least 10 retention members, at least 11 retention members, at least 12 retention members or at least 13 retention members.

14. The storage organizing article of claim 1, wherein each vertical wall segment of the plurality of vertical wall segments comprises at least a portion of at least one engagement footing of the plurality of engagement footings.

15. The storage organizing article of claim 1, wherein at least one vertical wall segment of the plurality of vertical wall segments comprises at least one engagement footing of the plurality of engagement footings.

16. The storage organizing article of claim 1, wherein at least one vertical wall segment of the plurality of vertical wall segments comprises more than one engagement footing of the plurality of engagement footings.

17. The storage organizing article of claim 1, wherein at least one vertical wall segment of the plurality of vertical wall segments comprises at least two engagement footings of the plurality of engagement footings.

18. The storage organizing article of claim 1, wherein at least one engagement footing of the plurality of engagement footings comprises a first half portion provided by one of the vertical wall segment of the plurality of vertical wall segments, and a second half portion provided by another one of the vertical wall segment of the plurality of vertical wall segments.

19. The storage organizing article of claim 1, wherein at least two of the plurality of vertical wall segments are releasably connectable to each other along a third axis;
wherein the third axis and the first axis are substantially perpendicular to each other; and
wherein the third axis and the second axis are substantially perpendicular to each other.

20. The storage organizing article of claim 1, wherein the plurality of vertical wall segments are releasably connectable to each other via a male connector and a female connector which are connectable to provide a connection with positive mechanical engagement.

21. The storage organizing article of claim 1, wherein the base wall is planar.

22. The storage organizing article of claim 1, wherein the foundation further comprises a perimeter rim which at least partially surrounds the horizontal floor.

23. The storage organizing article of claim 1, wherein the foundation further comprises a perimeter rim which completely surrounds the horizontal floor.

24. The storage organizing article of claim 1, wherein the foundation is in a form of a tray.

25. The storage organizing article of claim 1, wherein the foundation is formed of an injection molded thermoplastic composition.

26. The storage organizing article of claim 1, wherein the vertical wall segments are formed of an injection molded thermoplastic composition.

* * * * *